(12) United States Patent
Libsch et al.

(10) Patent No.: US 12,487,203 B2
(45) Date of Patent: Dec. 2, 2025

(54) SPIRAL IMPEDANCE STRUCTURE

(71) Applicant: International Business Machines Corporation, Armonk, NY (US)

(72) Inventors: Frank Robert Libsch, White Plains, NY (US); Venkat K. Balagurusamy, Airmont, NY (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 18/341,881

(22) Filed: Jun. 27, 2023

(65) Prior Publication Data

US 2025/0003905 A1   Jan. 2, 2025

(51) Int. Cl.
*G01N 27/02* (2006.01)
*H01F 27/28* (2006.01)
(Continued)

(52) U.S. Cl.
CPC ....... *G01N 27/028* (2013.01); *H01F 27/2804* (2013.01); *H01F 27/29* (2013.01); *H01F 41/041* (2013.01)

(58) Field of Classification Search
CPC ...... G01N 27/00; G01N 27/02; G01N 27/028; G01N 27/26; G01N 27/416; G01N 27/447; G01N 27/44704; G01N 27/44717; G01N 15/00; G01N 15/06; G01N 15/0656; G01N 15/10; G01N 27/4473; G01N 15/1023; H01F 27/00; H01F 27/28; H01F 27/2804;
(Continued)

(56) References Cited

U.S. PATENT DOCUMENTS 6,418,802 B1 *  7/2002  Wood ................... G01N 15/132
                                            73/865.5
6,749,736 B1    6/2004  Fuhr et al.
(Continued)

FOREIGN PATENT DOCUMENTS

CN        103923825 A    7/2014
CN        112986342 B    12/2022
(Continued)

OTHER PUBLICATIONS

Daza et al. "Monitoring living cell assays with bio-impedance sensors." Sensors and Actuators B: Chemical 176 (2013): 605-610.
(Continued)

*Primary Examiner* — Hoai-An D. Nguyen
(74) *Attorney, Agent, or Firm* — CANTOR COLBURN LLP; Samuel Waldbaum (57) ABSTRACT

An impedance sensing structure is provided and includes a dielectric layer, a spiral electrode pair forming a dual spiral channel on the dielectric layer and having an inlet portion at a central region of the dual spiral channel and an outlet portion at an end of the dual spiral channel, inlet and outlet elements and sensing circuitry. The inlet and outlet elements are coupled with the inlet and outlet portions, respectively, for directing fluid or gas to flow through the dual spiral channel. The sensing circuitry is electrically connected with the spiral electrode pair and configured to sense the particles in the fluid or gas in accordance with an impedance of the spiral electrode pair and the fluid or gas flowing through the dual spiral channel.

20 Claims, 4 Drawing Sheets

(51) Int. Cl.
*H01F 27/29* (2006.01)
*H01F 41/04* (2006.01)

(58) Field of Classification Search
CPC .......... H01F 41/00; H01F 41/02; H01F 41/04; H01F 27/29; H01F 41/041
USPC ........................................ 324/600, 649, 650
See application file for complete search history.

(56) References Cited

U.S. PATENT DOCUMENTS

| | | |
|---|---|---|
| 8,367,018 B2 | 2/2013 | Chuang et al. |
| 8,614,707 B2 | 12/2013 | Warsito et al. |
| 9,149,806 B2 | 10/2015 | Collins |
| 9,994,839 B2 | 6/2018 | Lo et al. |
| 10,746,685 B2 | 8/2020 | Marashdeh et al. |
| 10,806,366 B2 | 10/2020 | Marashdeh et al. |
| 11,092,564 B2 | 8/2021 | Marashdeh et al. |
| 11,440,007 B2 | 9/2022 | Watkins et al. |
| 2004/0147032 A1 | 7/2004 | Martin et al. |
| 2005/0112544 A1 | 5/2005 | Xu et al. |
| 2007/0139451 A1 | 6/2007 | Somasiri et al. |
| 2013/0085365 A1 | 4/2013 | Marashdeh et al. |
| 2017/0226916 A1* | 8/2017 | Zhang .................. F01N 13/008 |
| 2017/0342923 A1* | 11/2017 | Zhang ................ G01N 15/0656 |
| 2018/0120294 A1 | 5/2018 | Collins |
| 2018/0283254 A1* | 10/2018 | Zhang .................. F01N 13/008 |
| 2021/0379594 A1 | 12/2021 | Gong et al. |
| 2022/0314216 A1 | 10/2022 | Fan et al. |
| 2023/0323433 A1 | 10/2023 | Kubit et al. |

FOREIGN PATENT DOCUMENTS

| | | | |
|---|---|---|---|
| GB | 2337600 A * | 11/1999 | ............. G01N 15/13 |
| TW | 202223389 A | 6/2022 | |
| TW | 202516167 A | 4/2025 | |
| WO | 2012162779 A1 | 12/2012 | |
| WO | 2022112474 A1 | 6/2022 | |
| WO | 2025/002777 A1 | 1/2025 | |

OTHER PUBLICATIONS

Huang et al., "Investigation of the Effects of Electrode Geometry on the Performance of C4D Sensor with Radial Configuration", Sensors, 21.13 (2021), p. 1-16.

Igreja et al., "Analytical evaluation of the interdigital electrodes capacitance for a multi-layered structure." Sensors and Actuators A: Physical 112.2-3 (2004): 291-301.

King et al., "Microfluidic flow-encoded switching for parallel control of dynamic cellular microenvironments," The Royal Society of Chemistry, Lab Chip, 2008, pp. 107-116.

Tang et al., "New Contactless Conductivity Detection (CCD) Sensor for Fluid Conductivity Measurement," IEEE Sensors Journal, 20.19 (2020):, pp. 1-10.

Turolla et al. "Development of a miniaturized and selective impedance sensor for real-time slime monitoring in pipes and tanks." Sensors And Actuators B: Chemical 281 (2019): 288-295.

Yeo et al., "Microfluidic Devices for Bioapplications," Biomicrofluidics, Small, 2011, pp. 12-48.

International Search Report and Written Opinion; Mailed: Sep. 19, 2024; Application No. PCT/EP2024/065970; Filed: Jun. 10, 2024; 11 pages.

* cited by examiner

SPIRAL IMPEDANCE STRUCTURE

BACKGROUND

The present invention generally relates to impedance systems. More specifically, the present invention relates to a spiral impedance system structure for microelectronic sensing.

Capacitively coupled contactless conductivity detection (C4D) is a detection technique that is used mainly in capillary electrophoresis and microchip electrophoresis. The characteristics of a C4D detector are generally simple in structure, easy in miniaturization and integration and free of electrode contamination, all of which are common problems in an electrochemical detection.

SUMMARY

Embodiments of the invention are directed to an impedance sensing structure. A non-limiting example of the impedance sensing structure includes a dielectric layer, a spiral electrode pair forming a dual spiral channel on the dielectric layer and having an inlet portion at a central region of the dual spiral channel and an outlet portion at an end of the dual spiral channel, inlet and outlet elements and sensing circuitry. The inlet and outlet elements are coupled with the inlet and outlet portions, respectively, for directing fluid or gas to flow through the dual spiral channel. The sensing circuitry is electrically connected with the spiral electrode pair and configured to sense the particles in the fluid or gas in accordance with an impedance of the spiral electrode pair and the fluid or gas flowing through the dual spiral channel.

Embodiments of the present invention are directed to an impedance sensing structure for sensing particles in a fluid or gas. A non-limiting example of the impedance sensing structure includes a dielectric layer, a spiral electrode pair forming a dual spiral channel on the dielectric layer and having an inlet portion at a central region of the dual spiral channel and an outlet portion at an end of the dual spiral channel, inlet and outlet elements coupled with the inlet and outlet portions, respectively, for directing the fluid or gas to flow through the dual spiral channel and sensing circuitry electrically connected with the spiral electrode pair and configured to sense the particles in the fluid or gas in accordance with an impedance of the spiral electrode pair and the fluid or gas flowing through the dual spiral channel.

Embodiments of the present invention are directed to a method of fabricating an impedance sensing structure. A non-limiting example of the method includes forming dual spiral channel openings in a substrate and building a spiral electrode pair in the dual spiral channel openings such that each electrode of the spiral electrode pair extends upwardly from the substrate to form a dual spiral channel having an inlet portion at a central region of the dual spiral channel and an outlet portion at an end of the dual spiral channel. The method further includes coupling inlet and outlet elements with the inlet and outlet portions, respectively, for directing fluid or gas to flow through the dual spiral channel, electrically connecting sensing circuitry to the spiral electrode pair and configuring the circuitry to sense particles in the fluid or gas in accordance with an impedance of the dual spiral channel and the fluid or gas.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Turning now to an overview of technologies that are more specifically relevant to aspects of the invention, C4D was introduced as a quantification method for capillary electrophoresis because C4D tends to be an effective method of conductivity detection for fluidic analysis and measurement of small inorganic ions as well as organic and biochemical species. Compared with traditional contact conductivity detection methods, electrodes of a C4D sensor can be encapsulated or placed externally to a channel so that they are not in direct contact with the measured fluid. Hence, some unfavorable influence of contact conductivity detection methods (such as the electrode polarization and the electrochemical corrosion) can be avoided. Also, C4D can offer a universal and a non-destructive detection tool and scanning capability. In addition, C4D typically consumes relatively little power making C4D useful for field portable instruments, especially those powered by batteries.

Two different approaches are often pursued for C4D in microchip capillary electrophoresis. Either external electrodes are used, or the electrodes are built into the device but isolated from the electrolyte solution. The former arrangement is simpler, as the construction of chips without embedded electrodes requires fewer manufacturing steps, but the latter approach allows for closer distances between the channel and the electrodes. C4D sensitivity is directly proportional to the distance of the electrodes from the separation channel.

Current sensor challenges are to obtain higher sensitivities in increasingly lower concentration assays for earlier detection. One such application is the identification of the earliest in time or the start of the lowest concentrations levels or viruses/bacteria formation in the food supply chain or detection of human infection/transmission. Another application to benefit would be the measurement of cellular membrane properties (capacitance and conductance) and monitor changes due to the action of pharmaceuticals or toxins.

Turning now to an overview of the aspects of the invention, one or more embodiments of the invention address the above-described shortcomings of the prior art by providing for a spiral impedance sensing structure and method in which spiral fluidics eliminate non-uniform or spatially changing cell sidewall interactions and allows unrestricted particle flows. The spiral impedance sensing structure enables a full range of laminar particle flow from static to dynamic flow rates, is scalable to nanoparticle detection in size and single particle detection in quantity, enables flexible resolution through parameter selection that tailors optimum costs to a signal-to-noise (S/N) ratio (these parameters being [Flow Rate Decrease]×[Electrode Area Increase]×[# of Electrodes in parallel and/or in series]×[Dwell-Time Increase]) and is compatible with guarded electrode fabrication methods that eliminate electromagnetic interference (EMI) issues and adjacent electrode crosstalk and resulting errors. In addition, the spiral impedance sensing structure allows for encapsulated or unencapsulated electrodes and for methods of differential sensing.

The above-described aspects of the invention address the shortcomings of the prior art by providing for an impedance sensing structure that includes a dielectric layer, a spiral electrode pair forming a dual spiral channel on the dielectric layer and having an inlet portion at a central region of the spiral channel and an outlet portion at an end of the spiral channel, inlet and outlet elements and sensing circuitry. The inlet and outlet elements are coupled with the inlet and outlet portions, respectively, for directing fluid or gas to flow through the spiral channel. The sensing circuitry is electrically connected with the spiral electrode pair and configured to sense the particles in the fluid or gas in accordance with an impedance of the spiral electrode pair and the fluid or gas flowing through the spiral channel.

Figure 1:
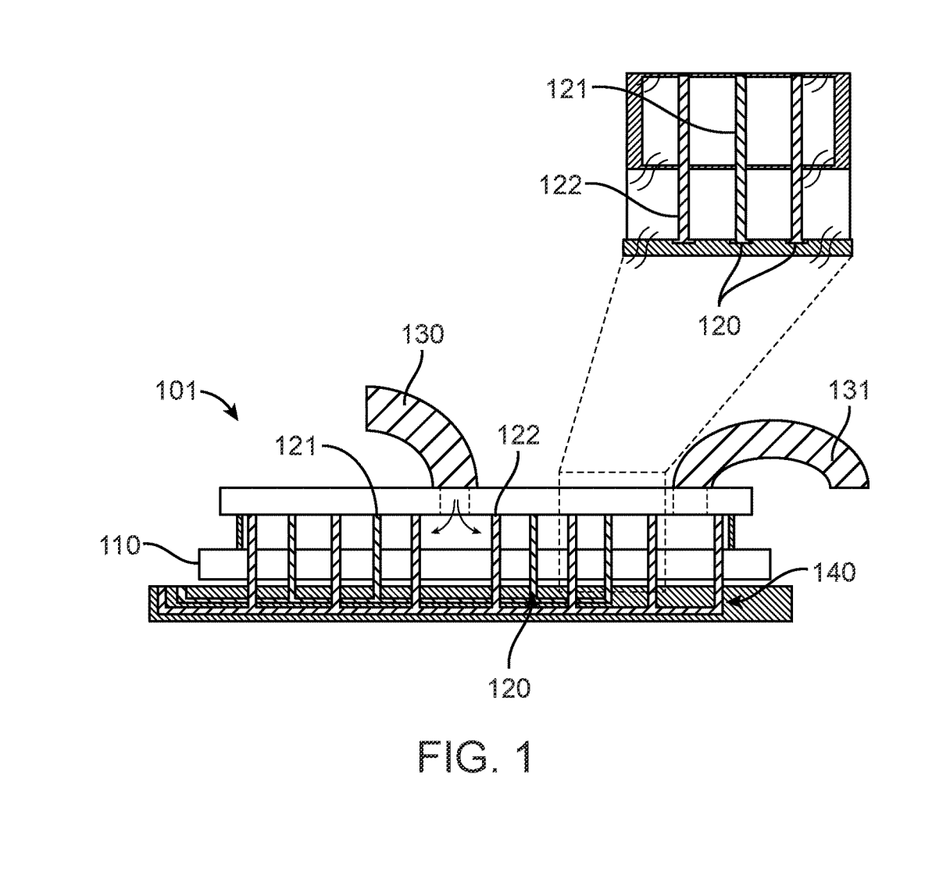
FIG. 1 is a side view of an impedance sensing structure in accordance with one or more embodiments of the present invention.
Figure 2:
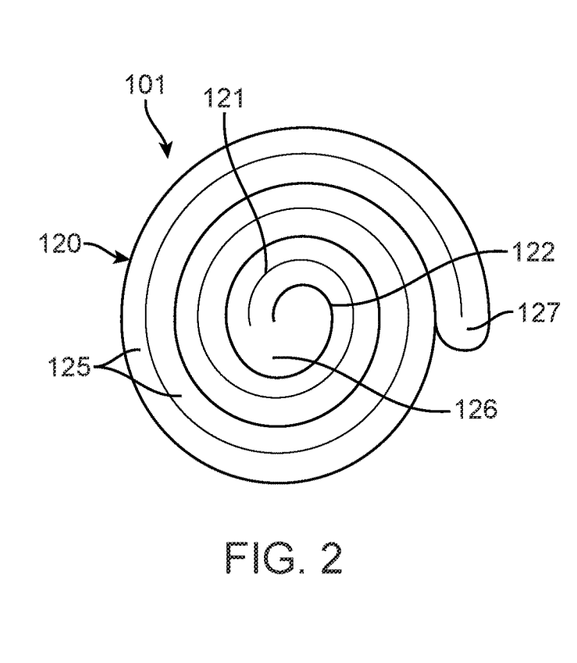
FIG. 2 is a top-down view of a spiral channel of the impedance sensing structure of FIG. 1 in accordance with one or more embodiments of the present invention.

Turning now to a more detailed description of aspects of the present invention, FIGS. 1 and 2 depict an impedance sensing structure 101 for sensing particles in a fluid or gas. The impedance sensing structure 101 eliminates sidewalls and resulting artifacts, such as eddy currents and non-uniform flow rates across electrodes. The impedance sensing structure 101 also eliminates the practice of complex 2D/3D capacitance measurements and the follow-on complex volume tomography modeling. The impedance sensing structure 101 can be broadly applied to micro- and nano-scaling sensing applications (i.e., for bacteria, viruses, DNA, proteins, etc.,) and can also be applied to large size scaling applications (such as detecting % water/water-like fluids within oil pipelines, etc.,).

The impedance sensing structure 101 includes a dielectric layer 110 and a spiral electrode pair 120, which includes a first spiral electrode 121 and a second spiral electrode 122 that spiral together forming a dual spiral channel 125 on the dielectric layer 110. The dual spiral channel 125 has an inlet portion 126 at a central region of the spiral channel 125 and an outlet portion 127 at an end of the spiral channel 125. It is understood that the mentioned inlet portion and the outlet portion may be interchanged, such as the inlet portion may be 127 and the outlet portion may be 126, and in general, this flexibility in inlet portion and outlet portion assignment applied to all embodiments mentioned herewithin. The impedance sensing structure 101 further includes an inlet element 130 coupled with the inlet portion 126 and an outlet element 131 coupled with the outlet portion 127 for directing the fluid or gas to flow through the dual spiral channel 125 as well as sensing circuitry 140. The sensing circuitry 140 can be disposed within a printed circuit board (PCB) adjacent to or part of the dielectric layer 110 and is electrically connected with the first spiral electrode 121 and the second spiral electrode 122 of the spiral electrode pair 120. The sensing circuitry 140 is configured to sense the particles in the fluid or gas in accordance with an impedance of the spiral electrode pair 120 and the fluid or gas flowing through the dual spiral channel 125 between the first spiral electrode 121 and the second spiral electrode 122. The first and second spiral electrodes 121, 122 of the spiral electrode pair 120 can be at least one of spaced proportionally to a flow rate of fluid in the dual spiral channel 125 and a particle population rate of change.

The impedance sensing structure 101 can thus be provided as a component of an impedance system for measuring particle/virus/cellular/organism membrane properties (i.e., capacitance and conductance), for example, and for monitoring internal changes, such as formation, growth, death, etc., and changes resulting from externalities, such as those due to pharmaceuticals or toxins. The materials of the impedance sensing structure 101 may be generally bio- or otherwise compatible. This includes the dielectric layer 110, which can be formed of glass, plastic, silicon, etc., the first and second spiral electrodes 121, 122, which can be formed of gold, platinum, indium-ton-oxide, iridium, etc., electrode insulators, which can be formed of photoresist, polyimide, PMMA, silicon dioxide, silicon nitride, etc., and chamber housing components, which can be formed of adhesives, sealants, tubing, valves and pumps as well as certain electrical stimulus and/or measurement components. The impedance sensing structure 101 can be compatible with impedance spectra between about 20 Hz and about 2 MHz, for example, where the impedance spectra can be determined by an LCR meter with a set forcing amplitude, such as 50 mV, for example.

Impedance measurements can be taken by the impedance sensing structure 101 as follows. For cases in which the first and second spiral electrodes 121, 122 are in contact with an ionic solution, impedance is composed by a capacitance of an electrochemical double layer, $C_{DL}$, and by an ionic resistance, $R_{ion}$, while scaling with the bulk liquid electrical conductivity. In these or other cases, impedance can be measured at a frequency $f_c=1/(I*R_{ion}*C_{DL})$, where $C_{DL}$ can be shorted and $R_{ion}=\rho \cdot L/A$, and where p is a fluid or a gas mass resistivity, L is a length of the first and second spiral electrodes 121, 122 and A is an area of the dual spiral channel 125.

As a general matter, impedance resolution is proportional to sensing length especially for very low concentrations of particles, viruses and bacteria. As such, the spiral pattern of the dual spiral channel 125 provides for laminar fluid flow through the dual spiral channel and provides the first and second spiral electrodes 121, 122 with particularly long lengths given an available surface area without generations of eddy currents as in serpentine configurations.

With continued reference to FIGS. 1 and 2 and with additional reference to FIGS. 3-6 and in accordance with one or more further embodiments of the present invention, the impedance sensing structure 101 can be provided with additional or alternative configurations.

Figure 3:
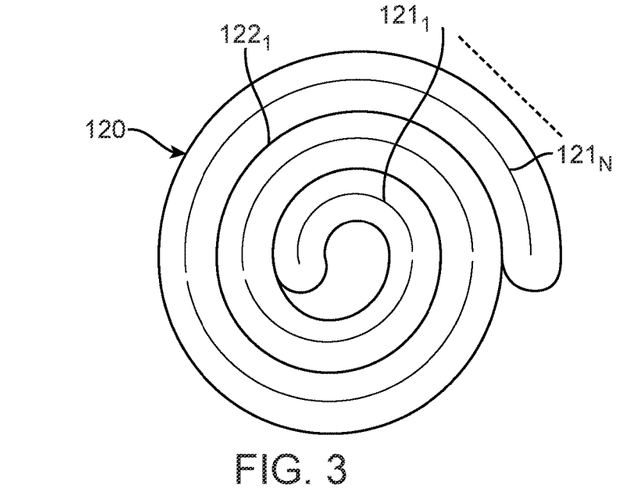
FIG. 3 is a top-down view of a spiral channel with electrode sections of the impedance sensing structure of FIG. 1 in accordance with one or more embodiments of the present invention.

As shown in FIG. 3, the first spiral electrode 121 of the spiral electrode pair 120 can include multiple spiral electrode sections from 1211 to 121N, denoted 1211-N, which are arranged in an end-to-end pattern and which are insulated from one another, and the second spiral electrode 122 of the spiral electrode pair can be provided as a common spiral electrode 1221 that extends along each of the multiple spiral electrode sections 1211-N.

Figure 4:
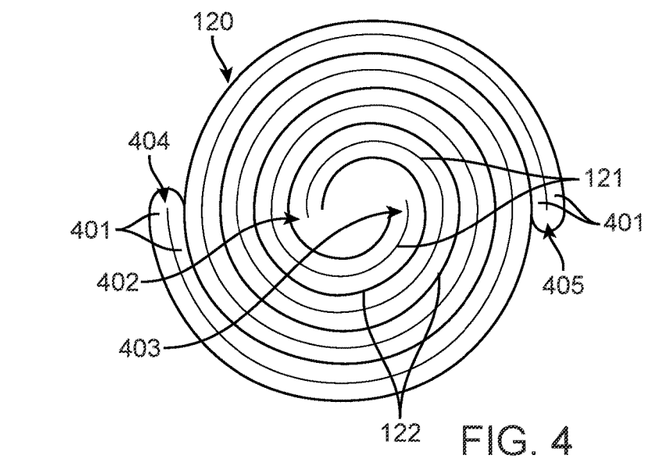
FIG. 4 is a top-down view of a double-dual spiral channel of the impedance sensing structure of FIG. 1 in accordance with one or more embodiments of the present invention.

As shown in FIG. 4, two pairs of the first and second spiral electrodes 121, 122 of the spiral electrode pair 120 respectively form a double-dual spiral channel 401 having dual inlet portions 402, 403 and dual outlet portions 404, 405. It is to be understood that although FIG. 4 illustrates the double-dual spiral channel 401, other embodiments are possible, such as a triple-dual spiral channel, a quad-dual spiral channel, etc.

Figure 5:
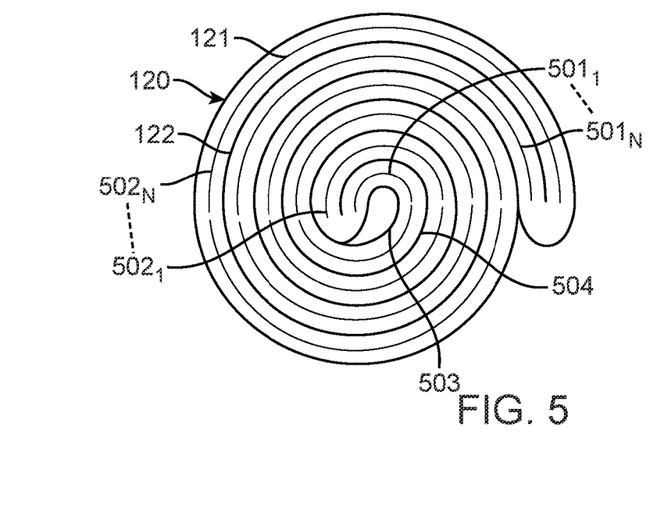
FIG. 5 is a top-down view of multiple spiral channels with sets of multiple spiral electrodes arranged end-to-end and insulated from one another and a pair of common spiral electrodes of the impedance sensing structure of FIG. 1 in accordance with one or more embodiments of the present invention.

As shown in FIG. 5, the first spiral electrode 121 of the spiral electrode pair 120 can include a first set of multiple spiral electrode sections $501_{1-N}$, which are arranged in an end-to-end pattern and which are insulated from one another, and a second set of multiple spiral electrode sections $502_{1-N}$, which are arranged in an end-to-end pattern and which are insulated from one another, and the second spiral electrode 122 of the spiral electrode pair 120 can be provided as a pair of common spiral electrodes 503 and 504 in which common spiral electrode 503 extends along each of the first set of the multiple spiral electrode sections $501_{1-N}$ and common spiral electrode 504 extends along each of the second set of the multiple spiral electrode sections $502_{1-N}$.

Figure 6:
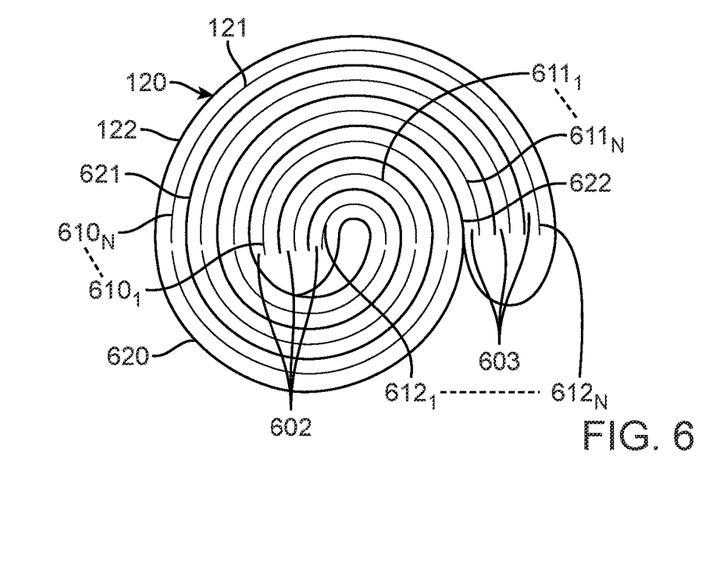
FIG. 6 is a top-down view of a multi-dual spiral channel having multiple inlet portions and multiple outlet portions of the impedance sensing structure of FIG. 1 in accordance with one or more embodiments of the present invention.

As shown in FIG. 6, multiple pairs of the first and second spiral electrodes 121, 122 of the spiral electrode pair 120 respectively form multi-dual spiral channels 601 having multiple inlet portions 602 and multiple outlet portions 603. Although not required, the multiple first spiral electrodes 121 in FIG. 6 can include multiple sets of multiple spiral electrode sections $610_{1-N}$, $611_{1-N}$ and $612_{1-N}$, which are arranged in an end-to-end pattern and which are insulated from one another, and the multiple second spiral electrodes 122 can be provided as common spiral electrodes 620, 621 and 621 that extend along each of the multiple sets of the multiple spiral electrode sections $610_{1-N}$, $611_{1-N}$ and $612_{1-N}$.

Figure 7:
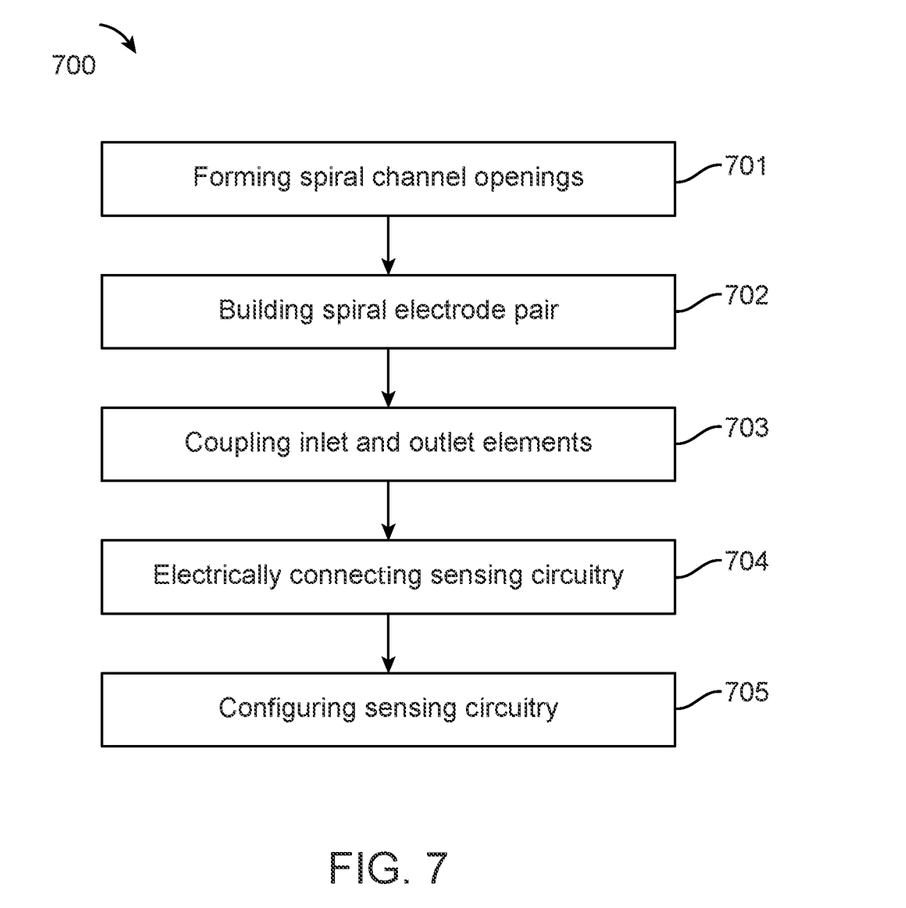
FIG. 7 is a flow diagram illustrating a method of fabricating an impedance sensing structure in accordance with one or more embodiments of the present invention.

With reference to FIG. 7, a method 700 of fabricating an impedance sensing structure, such as the impedance sensing structure 101 described above, is provided. As shown in FIG. 7, the method includes forming spiral channel openings in a substrate (block 701), building a spiral electrode pair in the spiral channel openings such that each electrode of the spiral electrode pair extends upwardly from the substrate to form a dual spiral channel having an inlet portion at a central region of the spiral channel and an outlet portion at an end of the spiral channel (block 702), coupling inlet and outlet elements with the inlet and outlet portions, respectively, for directing fluid or gas to flow through the spiral channel (block 703), electrically connecting sensing circuitry to the spiral electrode pair (block 704) and configuring the circuitry to sense particles in the fluid or gas in accordance with an impedance of the dual spiral channel and the fluid or gas (block 705). It is to be understood that the method 700 can be modified for at least the various embodiments of FIGS. 1 and 2 and each of FIGS. 3-6 without undue experimentation in view of the description provided above and below.

Figure 8:
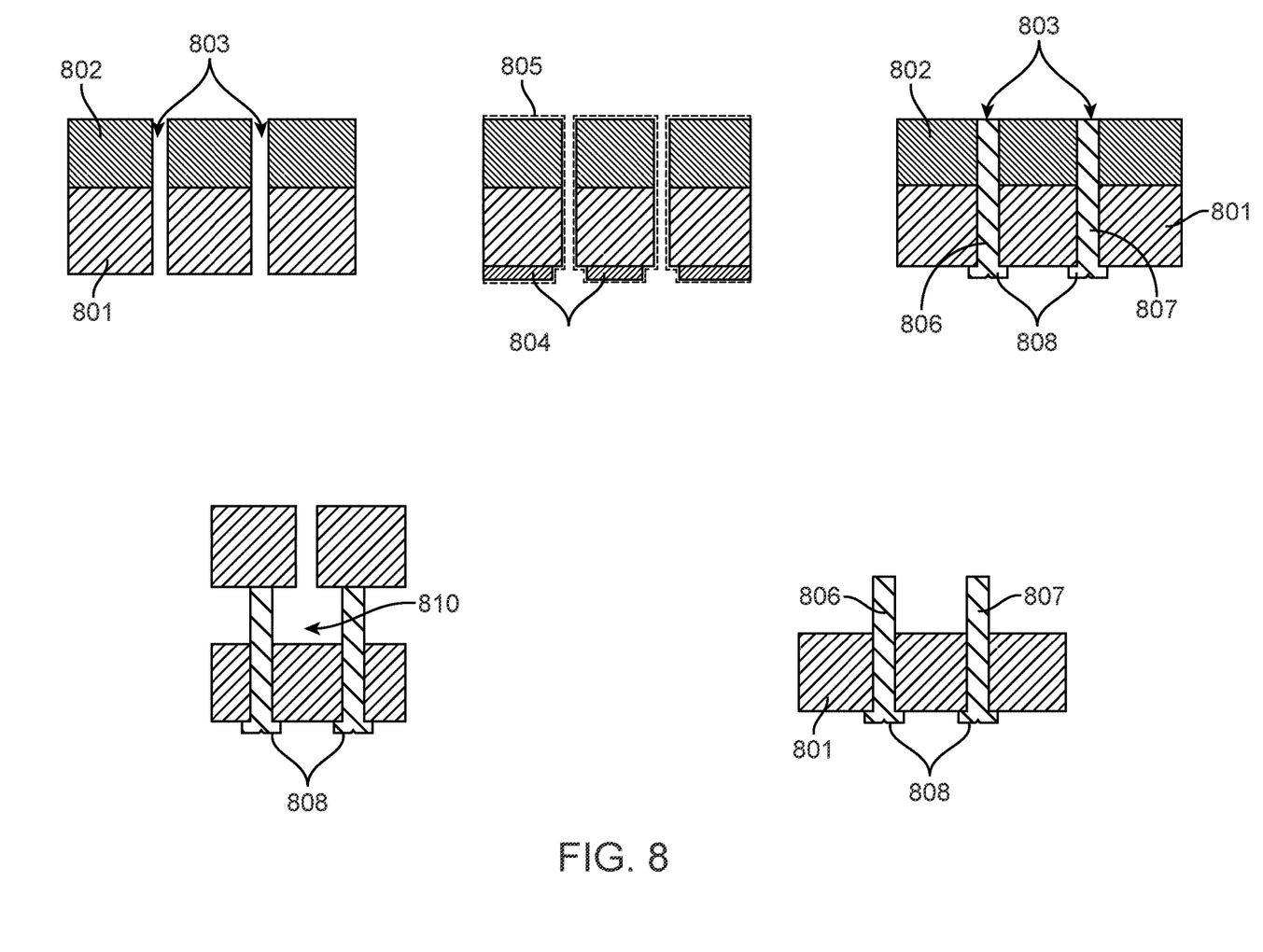
FIG. 8 is a graphical flow diagram illustrating the method of FIG. 7 in accordance with one or more embodiments of the present invention.

With reference to FIG. 8, operational stages of the method 700 of FIG. 7 are illustrated. As shown in FIG. 8, at an initial operational stage, a substrate 801 (i.e., a glass substrate) is formed with an insulator layer 802 deposited thereon and with through vias 803 formed through the substrate 801 and the insulator layer 802. The through vias 803 can be formed as a pair of spiral channel openings. At a next operational stage, backside substrate photolithography and seed layer formation are executed to form a sacrificial layer 804 defining spaces for pads of first and second electrodes along the through vias 803 and to form an adhesive seed layer 805 (i.e., of titanium, tantalum, etc.). At a next operational stage, first and second spiral electrodes 806, 807 (i.e., of copper) are formed in the through vias 803 with pads 808 and this is followed by front-side chemical mechanical polishing (CMP) and a selective etching of the insulator layer 802. At a final operational stage, an upper layer is provided to form inlet and outlet elements and to cover the first and second spiral electrodes 806, 807 to thereby form a dual spiral channel 810. Subsequently, the pads 808 can be bonded to sensing circuitry.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (rotated 90 degrees or at other orientations) and the spatially relative descriptors used herein interpreted accordingly.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

As previously noted herein, for the sake of brevity, conventional fabrication techniques may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication according to the present invention utilize a variety of individually known physical and chemical processes performed on a substrate, some of which are described in the immediately following paragraphs.

In general, the various processes used to form certain devices fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used for connections and isolations. Selective doping allows the conductivity of the substrate to be changed with the application of voltage. Lithography is the formation of three-dimensional relief images or patterns for subsequent transfer of the pattern to the substrate. In semiconductor lithography, the patterns are formed by a light sensitive polymer called a photo-resist. Lithography and etch pattern transfer steps can be repeated multiple times. Each pattern being printed is aligned to the previously formed patterns.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An impedance sensing structure, comprising:
a dielectric layer;
a spiral electrode pair forming a dual spiral channel on the dielectric layer and having an inlet portion at a central region of the dual spiral channel and an outlet portion at an end of the dual spiral channel,
the dual spiral channel comprising first and second spiral channels which extend in respective spirals in a side-by-side formation,
the inlet portion comprising a first inlet corresponding to the first spiral channel and a second inlet corresponding to the second spiral channel with the first and second inlets in the side-by-side formation, and
the outlet portion comprising a first outlet corresponding to the first spiral channel and a second outlet corresponding to the second spiral channel with the first and second outlets in the side-by-side formation;
inlet and outlet elements coupled with the inlet and outlet portions, respectively, for directing fluid or gas to flow through the dual spiral channel; and
sensing circuitry electrically connected with the spiral electrode pair and configured to sense the particles in the fluid or gas in accordance with an impedance of the spiral electrode pair and the fluid or gas flowing through the dual spiral channel.

2. The impedance sensing structure according to claim 1, wherein the spiral electrode pair are spaced proportionally to at least one of a flow rate of fluid in the dual spiral channel and a particle population rate of change with flow rate per unit time.

3. The impedance sensing structure according to claim 1, wherein the spiral electrode pair comprises multiple spiral electrodes arranged end-to-end and insulated from one another and a common spiral electrode.

4. The impedance sensing structure according to claim 1, wherein the spiral electrode pair forms a double-dual spiral channel having dual inlet portions and dual outlet portions,
the double-dual spiral channel comprising a first pair of first and second spiral channels which extend in respective spirals in a first side-by-side formation and a second pair of first and second spiral channels which extend in respective spirals in a second side-by-side formation,
the dual inlet portion comprising:
for the first pair of the first and second spiral channels, a first inlet corresponding to the first spiral channel and a second inlet corresponding to the second spiral channel with the first and second inlets in the first side-by-side formation; and,
for the second pair of the first and second spiral channels, a first inlet corresponding to the first spiral channel and a second inlet corresponding to the second spiral channel with the first and second inlets in the second side-by-side formation, and
the dual outlet portion comprising:
for the first pair of the first and second spiral channels, a first outlet corresponding to the first spiral channel and a second outlet corresponding to the second spiral channel with the first and second outlets in the first side-by-side formation; and,
for the second pair of the first and second spiral channels, a first outlet corresponding to the first spiral channel and a second outlet corresponding to the second spiral channel with the first and second outlets in the second side-by-side formation.

5. The impedance sensing structure according to claim 4, wherein the spiral electrode pair comprises first and second sets of multiple spiral electrodes arranged end-to-end and insulated from one another and a pair of common spiral electrodes.

6. The impedance sensing structure according to claim 1, wherein the spiral electrode pair forms a multi-dual spiral channel having multiple inlet portions and multiple outlet portions,
the multi-dual spiral channel comprising multiple first pairs of first and second spiral channels which extend in respective spirals in multiple first side-by-side formations and multiple second pairs of first and second spiral channels which extend in respective spirals in multiple second side-by-side formations,
the multiple inlet portions comprising:
for each of the multiple first pairs of the first and second spiral channels, multiple first inlets corresponding to the first spiral channels and multiple second inlets corresponding to the second spiral channels with the multiple first and second inlets in the multiple first side-by-side formations; and,
for each of the multiple second pairs of the first and second spiral channels, multiple first inlets corresponding to the first spiral channels and multiple second inlets corresponding to the second spiral channels with the multiple first and second inlets in the multiple second side-by-side formations, and
the dual outlet portion comprising:
for each of the multiple first pairs of the first and second spiral channels, multiple first outlets corresponding to the first spiral channels and multiple second outlets corresponding to the second spiral channels with the multiple first and second outlets in the multiple first side-by-side formations; and,
for each of the multiple second pairs of the first and second spiral channels, multiple first outlets corresponding to the first spiral channels and multiple second outlets corresponding to the second spiral channels with the multiple first and second outlets in the multiple second side-by-side formations.

7. The impedance sensing structure according to claim 6, wherein the spiral electrode pair comprises multiple sets of multiple spiral electrodes arranged end-to-end and insulated from one another and multiple common spiral electrodes.

8. An impedance sensing structure for sensing particles in a fluid or gas, the impedance sensing structure comprising:
a dielectric layer;
a spiral electrode pair forming a dual spiral channel on the dielectric layer and having an inlet portion at a central region of the dual spiral channel and an outlet portion at an end of the dual spiral channel,
the dual spiral channel comprising first and second spiral channels which extend in respective spirals in a side-by-side formation, the inlet portion comprising a first inlet corresponding to the first spiral channel and a second inlet corresponding to the second spiral channel with the first and second inlets in the side-by-side formation, and the outlet portion comprising a first outlet corresponding to the first spiral channel and a second outlet corresponding to the second spiral channel with the first and second outlets in the side-by-side formation;

inlet and outlet elements coupled with the inlet and outlet portions, respectively, for directing the fluid or gas to flow through the dual spiral channel; and sensing circuitry electrically connected with the spiral electrode pair and configured to sense the particles in the fluid or gas in accordance with an impedance of the spiral electrode pair and the fluid or gas flowing through the dual spiral channel.

9. The impedance sensing structure according to claim 8, wherein the spiral electrode pair are spaced proportionally to at least one of a flow rate of fluid in the dual spiral channel and a particle population rate of change with flow rate per unit time.

10. The impedance sensing structure according to claim 8, wherein the spiral electrode pair comprises multiple spiral electrodes arranged end-to-end and insulated from one another and a common spiral electrode.

11. The impedance sensing structure according to claim 8, wherein the spiral electrode pair forms a double-dual spiral channel having dual inlet portions and dual outlet portions, the double-dual spiral channel comprising a first pair of first and second spiral channels which extend in respective spirals in a first side-by-side formation and a second pair of first and second spiral channels which extend in respective spirals in a second side-by-side formation, the dual inlet portion comprising:
for the first pair of the first and second spiral channels, a first inlet corresponding to the first spiral channel and a second inlet corresponding to the second spiral channel with the first and second inlets in the first side-by-side formation; and, for the second pair of the first and second spiral channels, a first inlet corresponding to the first spiral channel and a second inlet corresponding to the second spiral channel with the first and second inlets in the second side-by-side formation, and the dual outlet portion comprising:
for the first pair of the first and second spiral channels, a first outlet corresponding to the first spiral channel and a second outlet corresponding to the second spiral channel with the first and second outlets in the first side-by-side formation; and, for the second pair of the first and second spiral channels, a first outlet corresponding to the first spiral channel and a second outlet corresponding to the second spiral channel with the first and second outlets in the second side-by-side formation.

12. The impedance sensing structure according to claim 11, wherein the spiral electrode pair comprises first and second sets of multiple spiral electrodes arranged end-to-end and insulated from one another and a pair of common spiral electrodes.

13. The impedance sensing structure according to claim 8, wherein the spiral electrode pair forms a multi-dual spiral channel having multiple inlet portions and multiple outlet portions, the multi-dual spiral channel comprising multiple first pairs of first and second spiral channels which extend in respective spirals in multiple first side-by-side formations and multiple second pairs of first and second spiral channels which extend in respective spirals in multiple second side-by-side formations, the multiple inlet portions comprising:
for each of the multiple first pairs of the first and second spiral channels, multiple first inlets corresponding to the first spiral channels and multiple second inlets corresponding to the second spiral channels with the multiple first and second inlets in the multiple first side-by-side formations; and, for each of the multiple second pairs of the first and second spiral channels, multiple first inlets corresponding to the first spiral channels and multiple second inlets corresponding to the second spiral channels with the multiple first and second inlets in the multiple second side-by-side formations, and the dual outlet portion comprising:
for each of the multiple first pairs of the first and second spiral channels, multiple first outlets corresponding to the first spiral channels and multiple second outlets corresponding to the second spiral channels with the multiple first and second outlets in the multiple first side-by-side formations; and, for each of the multiple second pairs of the first and second spiral channels, multiple first outlets corresponding to the first spiral channels and multiple second outlets corresponding to the second spiral channels with the multiple first and second outlets in the multiple second side-by-side formations.

14. The impedance sensing structure according to claim 13, wherein the spiral electrode pair comprises multiple sets of multiple spiral electrodes arranged end-to-end and insulated from one another and multiple common spiral electrodes.

15. A method of fabricating an impedance sensing structure, the method comprising:
forming dual spiral channel openings in a substrate;
building a spiral electrode pair in the dual spiral channel openings such that each electrode of the spiral electrode pair extends upwardly from the substrate to form a dual spiral channel having an inlet portion at a central region of the dual spiral channel and an outlet portion at an end of the dual spiral channel;
coupling inlet and outlet elements with the inlet and outlet portions, respectively, for directing fluid or gas to flow through the dual spiral channel;
electrically connecting sensing circuitry to the spiral electrode pair; and
configuring the circuitry to sense particles in the fluid or gas in accordance with an impedance of the dual spiral channel and the fluid or gas,
wherein the building of the spiral electrode is executed such that:
the dual spiral channel comprises first and second spiral channels which extend in respective spirals in a side-by-side formation,
the inlet portion comprises a first inlet corresponding to the first spiral channel and a second inlet corresponding to the second spiral channel with the first and second inlets in the side-by-side formation, and
the outlet portion comprises a first outlet corresponding to the first spiral channel and a second outlet corresponding to the second spiral channel with the first and second outlets in the side-by-side formation.

16. The method according to claim 15, wherein the building of the spiral electrode pair comprises:

arranging multiple spiral electrodes end-to-end;
insulating the multiple spiral electrodes from one another; and
configuring the multiple spiral electrodes in a spiral pattern with a common spiral electrode.

17. The method according to claim 15, wherein the building of the spiral electrode pair is executed such that the spiral electrode pair forms a double-dual spiral channel having dual inlet portions and dual outlet portions,
the double-dual spiral channel comprising a first pair of first and second spiral channels which extend in respective spirals in a first side-by-side formation and a second pair of first and second spiral channels which extend in respective spirals in a second side-by-side formation,
the dual inlet portion comprising:
for the first pair of the first and second spiral channels, a first inlet corresponding to the first spiral channel and a second inlet corresponding to the second spiral channel with the first and second inlets in the first side-by-side formation; and,
for the second pair of the first and second spiral channels, a first inlet corresponding to the first spiral channel and a second inlet corresponding to the second spiral channel with the first and second inlets in the second side-by-side formation, and
the dual outlet portion comprising:
for the first pair of the first and second spiral channels, a first outlet corresponding to the first spiral channel and a second outlet corresponding to the second spiral channel with the first and second outlets in the first side-by-side formation; and,
for the second pair of the first and second spiral channels, a first outlet corresponding to the first spiral channel and a second outlet corresponding to the second spiral channel with the first and second outlets in the second side-by-side formation.

18. The method according to claim 17, wherein the building of the spiral electrode pair comprises:
arranging first and second sets of multiple spiral electrodes end-to-end;
insulating the first and second sets of the multiple spiral electrodes from one another; and
configuring the first and second sets of multiple spiral electrodes in a pair of spiral patterns with a pair of common spiral electrodes.

19. The method according to claim 15, wherein the building of the spiral electrode pair is executed such that the spiral electrode pair forms a multi-dual spiral channel having multiple inlet portions and multiple outlet portions,
the multi-dual spiral channel comprising multiple first pairs of first and second spiral channels which extend in respective spirals in multiple first side-by-side formations and multiple second pairs of first and second spiral channels which extend in respective spirals in multiple second side-by-side formations,
the multiple inlet portions comprising:
for each of the multiple first pairs of the first and second spiral channels, multiple first inlets corresponding to the first spiral channels and multiple second inlets corresponding to the second spiral channels with the multiple first and second inlets in the multiple first side-by-side formations; and,
for each of the multiple second pairs of the first and second spiral channels, multiple first inlets corresponding to the first spiral channels and multiple second inlets corresponding to the second spiral channels with the multiple first and second inlets in the multiple second side-by-side formations, and
the dual outlet portion comprising:
for each of the multiple first pairs of the first and second spiral channels, multiple first outlets corresponding to the first spiral channels and multiple second outlets corresponding to the second spiral channels with the multiple first and second outlets in the multiple first side-by-side formations; and,
for each of the multiple second pairs of the first and second spiral channels, multiple first outlets corresponding to the first spiral channels and multiple second outlets corresponding to the second spiral channels with the multiple first and second outlets in the multiple second side-by-side formations.

20. The method according to claim 19, wherein the building of the spiral electrode pair comprises:
arranging multiple sets of multiple spiral electrodes end-to-end;
insulating the multiple sets of the multiple spiral electrodes from one another; and
configuring the multiple sets of the multiple spiral electrodes in multiple spiral patterns with multiple common spiral electrodes.

* * * * *